(12) United States Patent
Wang

(10) Patent No.: US 10,782,754 B2
(45) Date of Patent: Sep. 22, 2020

(54) THERMAL MANAGEMENT VIA VIRTUAL BMC MANAGER

(71) Applicant: QUANTA COMPUTER INC., Taoyuan (TW)

(72) Inventor: Chun-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/138,319

(22) Filed: Sep. 21, 2018

(65) Prior Publication Data

US 2020/0097056 A1    Mar. 26, 2020

(51) Int. Cl.
*G06F 1/20* (2006.01)
*G05B 19/406* (2006.01)
*G05B 19/4155* (2006.01)

(52) U.S. Cl.
CPC .......... *G06F 1/206* (2013.01); *G05B 19/406* (2013.01); *G05B 19/4155* (2013.01); *G05B 2219/49206* (2013.01)

(58) Field of Classification Search
None
See application file for complete search history.

(56) References Cited

U.S. PATENT DOCUMENTS

| | | |
|---|---|---|
| 9,915,984 B2 | 3/2018 | Berke et al. |
| 2008/0065912 A1 | 3/2008 | Bodner et al. |
| 2013/0289926 A1* | 10/2013 | Maity .................. G06F 9/45533 702/130 |
| 2014/0195669 A1* | 7/2014 | Bhatia .................. G06F 11/3006 709/224 |
| 2015/0355651 A1 | 12/2015 | Balakrishnan et al. |
| 2019/0200489 A1* | 6/2019 | Martinez Garcia .......................... H05K 7/20781 |

FOREIGN PATENT DOCUMENTS

| | | |
|---|---|---|
| CN | 104412198 A | 3/2015 |
| CN | 106462202 A | 2/2017 |
| EP | 3261420 A1 | 12/2017 |
| JP | 2016-206844 A | 12/2016 |

(Continued)

OTHER PUBLICATIONS

Chun-Hung Wang, Instant application's specification (Year: 2018).*

(Continued)

*Primary Examiner* — Kenneth M Lo
*Assistant Examiner* — Istiaque Ahmed
(74) *Attorney, Agent, or Firm* — Nixon Peabody LLP

(57) ABSTRACT

A method of thermal management in a computing device using a management controller is provided. The method includes obtaining, via a virtual management controller, monitoring information of a thermally sensitive component untethered to the management controller. The monitoring information can include temperature information of the thermally sensitive component. The method also includes transmitting, via the virtual management controller, the monitoring information to the management controller via a system interface of the management controller. Finally, the method includes adjusting, via the management controller, operation of a thermal management component of the computing device tethered to the management controller.

20 Claims, 6 Drawing Sheets

(56) References Cited

FOREIGN PATENT DOCUMENTS

| | | |
|---|---|---|
| TW | 200602849 A | 1/2006 |
| TW | 201306428 A | 2/2013 |
| WO | 2016160224 A1 | 10/2016 |

OTHER PUBLICATIONS

Chun-Hung Wang, Instant application's drawings (Year: 2018).*
Extended European Search Report for EP Application No. 18215319.7, dated Jul. 8, 2019.
TW Office Action for Application No. 107140265, dated Nov. 12, 2019, w/ First Office Action Summary.
TW Search Report for Application No. 107140265, dated Nov. 12, 2019, w/ First Office Action.
JP Office Action for Application No. 2019-004915, dated Feb. 20, 2020, w/ First Office Action Summary.

* cited by examiner

THERMAL MANAGEMENT VIA VIRTUAL BMC MANAGER

CROSS-REFERENCE TO RELATED APPLICATIONS

This application is related to Ser. No. 16/138,260, entitled, "THERMAL MANAGEMENT VIA PCIE TOPOLOGY", and Ser. No. 16/138,292, entitled, "THERMAL MANAGEMENT VIA OPERATING SYSTEM", both of which are being filed concurrently.

FIELD OF THE INVENTION

The present invention relates to computer systems and non-transitory computer readable mediums for establishing a virtual [a] Baseboard Management Controller (BMC) to receive temperature information from individual electronic units within a computing device.

BACKGROUND

The various components making up a computer system typically operate within a range of parameters defined by performance protocols or standards. For instance, the temperature within a computer chassis is often monitored to detect when the system may rise above a predetermined temperature reading. Other forms of information that may be monitored within a computer system include, without limitation, voltages associated with semiconductor components located on the baseboard of the system; velocity (e.g., rpm) of cooling fans located on the baseboard or within the system chassis; and the velocity of spindle motors within hard disk drives or optical drives.

Various types of sensors are being used to detect health, operating, and performance-related parameters associated with a computer system and its constituent components. These sensors include thermostats, voltage meters, and tachometers. A computer system typically employs one or more management modules to assist in the collection and analysis of information sensed by the various sensors measuring operating and performance-related parameters within the system. These management modules may be either software or hardware components, but typically encompass both hardware and software components that are implemented by service processors. One such management module is referred to as a "Baseboard Management Controller" (BMC). The BMC is a microcontroller integrated into the baseboard (also known in the industry as the "motherboard") of a computer system, and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system. The BMC is also programmed to analyze this information to determine whether any of the sensed parameters are currently outside of an expected or recommended operating range, the occurrence of which is commonly referred to as an "event."

In some computer systems, the BMC is unable to communicate directly with the hardware components. In these cases, the hardware components may have an integrated system that detects when it's temperature is approaching predetermined threshold levels that would cause lack of performance or catastrophic failure. The integrated system of the hardware components is not connected to a fan system within the computer systems, thereby making the fan system inefficient. Therefore, there is a need to provide a computer system that establishes a connection between the BMC and the hardware components.

SUMMARY

A method of thermal management in a computing device using a management controller is provided. The method includes obtaining, via a virtual management controller, monitoring information of a thermally sensitive component untethered to the management controller. The monitoring information can include temperature information of the thermally sensitive component. The method also includes transmitting, via the virtual management controller, the monitoring information to the management controller via a system interface of the management controller. Finally, the method includes adjusting, via the management controller, the operation of a thermal management component of the computing device tethered to the management controller.

In some embodiments of the disclosure, the monitoring information for the thermally sensitive component includes identification information. Furthermore, the monitoring information for the thermally sensitive component can include a slowdown temperature, a shutdown temperature, and a current temperature. In some embodiments, the thermally sensitive component can include a graphics processing unit. In addition, a virtual baseboard management controller manager can be implemented to manage messages received at the management controller from two or more virtual management controllers.

In some embodiments, the management controller can be a baseboard management controller. Furthermore, the thermal management component can be a fan device. In addition, the virtual management controller can be a virtual baseboard management controller.

A computer system for thermal management of a computing device using a management controller is also provided. The computer system can include a thermally sensitive component, specifically a management controller that includes a system interface. The management controller can be untethered to the thermally sensitive component. The system can also include a thermal management component tethered to the management controller and a virtual management controller. The virtual management controller can be configured to obtain monitoring information of the thermally sensitive component untethered to the management controller. In some embodiments, the monitoring information can include temperature information of the thermally sensitive component. The virtual management controller can also be configured to transmit the monitoring information to the management controller via the system interface of the management controller. Finally, the virtual management controller can be configured to adjust operation of the thermal management component tethered to the management controller.

A non-transitory computer readable medium that stores instructions executable by at least one processor is also provided. The stored instructions can include obtaining, via a virtual management controller, monitoring information of a thermally sensitive component untethered to the management controller. The monitoring information can include temperature information of the thermally sensitive component. The method also includes transmitting, via the virtual management controller, the monitoring information to the management controller via a system interface of the management controller. Finally, the method includes adjusting, via the management controller, operation of a thermal management component of the computing device tethered to the management controller.

Additional features and advantages of the disclosure will be set forth in the description that follows, and in part, will be obvious from the description; or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited disclosure and its advantages and features can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

DETAILED DESCRIPTION

Figure 1:
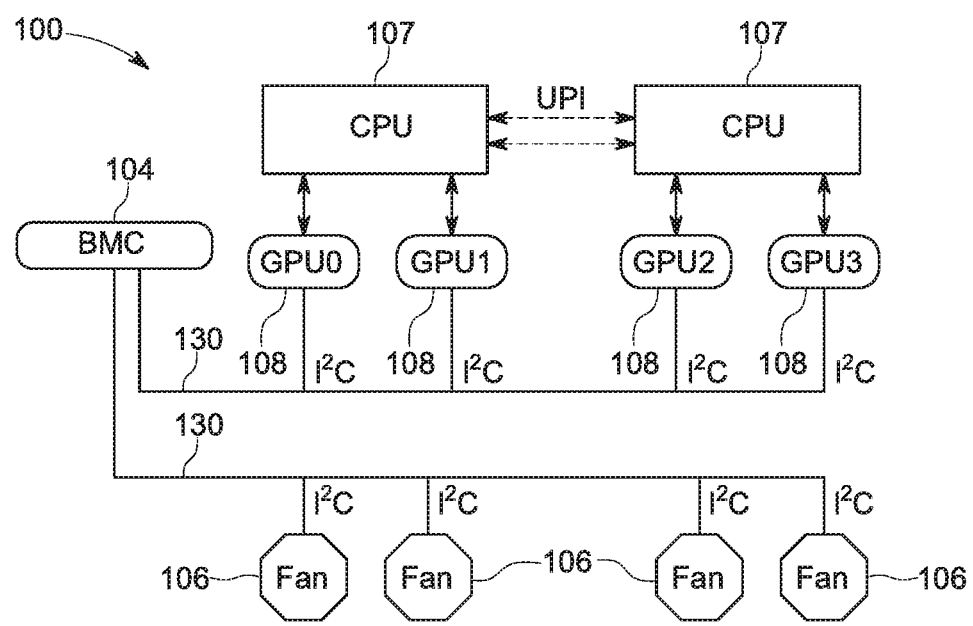
FIG. 1 is prior art that schematically depicts a conventional computer system.

The present invention is described with reference to the attached figures, where like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of the foregoing, to the present application teaches a method and computer system for thermal management in a computing device using a management controller. The method includes obtaining, via a virtual management controller, monitoring information of a thermally sensitive component untethered to the management controller. The monitoring information can include temperature information of the thermally sensitive component. The method also includes transmitting, via the virtual management controller, the monitoring information to the management controller via a system interface of the management controller. Finally, the method includes adjusting, via the management controller, operation of a thermal management component of the computing device tethered to the management controller.

FIG. 1 schematically depicts a conventional computer system 100. The computer system 100 has central processing units (CPU) 107. The CPUs 107 are standard central processors that perform arithmetic and logical operations necessary for the operation of the computer system 100. The CPUs 107 can be connected to graphic processor units (GPU) 108. Like many electrical components, the GPUs 108 dissipate heat while operating. As such, the computer system 100 can provide fans 106 to cool off the GPUs 108 after the GPUs 108 reach a prescribed temperature.

Such a determination, i.e., whether the GPUs 108 exceed a prescribed temperature, is made by a baseboard management controller (BMC) 104. In certain embodiments, the GPUs 108 can be in communication with a management bus 130 of the host computer system 100 to provide information regarding the GPUs' health, operating, and performance conditions to the BMC 104. Such information can include the GPU voltage and temperature. Each GPU 108 can be connected to sensors (not shown) measuring the electrical component's health, operating, and performance-related parameters through, for example, the management bus 130. This information can be sent to the BMC 104 by way of the management bus 130. The BMC 104 is also communicatively coupled by way of the management bus 130 to the fans 106 to control functionality over the fans 106.

The component that initiates communication on a bus is referred to as a master, and the component to which the communication is sent is referred to as a slave. The BMC component 104 typically functions as the master on the management bus 130, but may also function as either a master or a slave in other circumstances. Each of the various components communicatively connected to the BMC 104 by way of the management bus 130 can be addressed using a slave address. The management bus 130 is used by the BMC 104 to request and/or receive various health, operating, and performance-related parameters from one or more components, which can be also communicatively connected to the management bus 130. In FIG. 1, the management bus 130 communicatively connects the BMC 104 to the GPUs 108 (and its temperature sensor (not shown)) and the CPU fans 106, thereby providing a means for the BMC 104 to monitor and/or control operation of these components. The management bus 130 can typically include tachometers, heat sensors, voltage meters, amp meters, and digital and analog sensors. In certain embodiments, the management bus 130 is an I$^2$C bus. While the computer system 100 exemplifies direct connection between the GPUs 108 and the BMC 104 using the I²C bus, it is important to note that not every available GPU in the industry is able to support transmitting the I²C temperature signal to the BMC 104.

Figure 2:
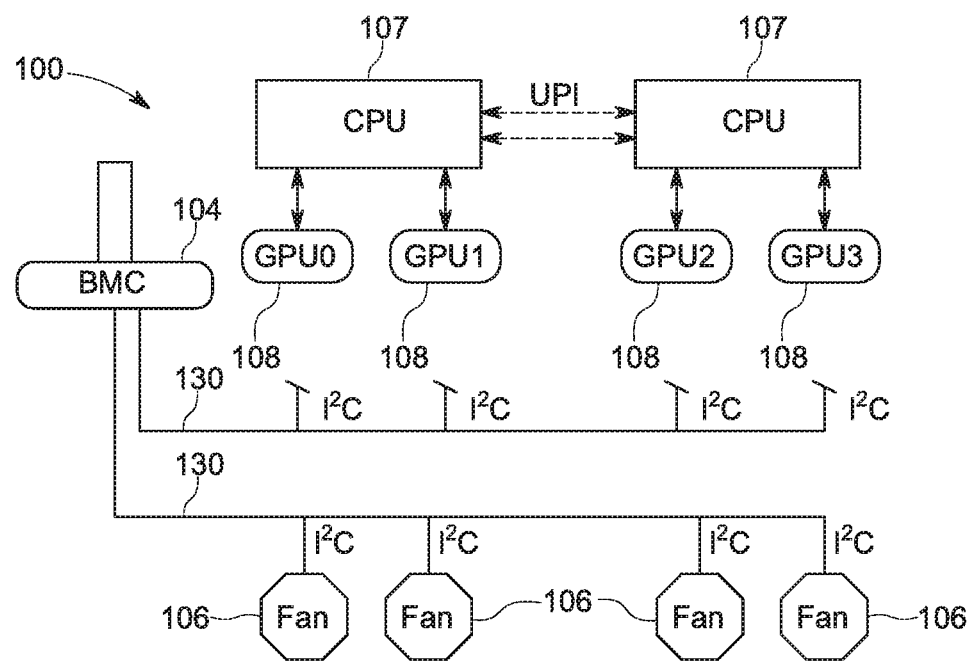
FIG. 2 is prior art that schematically depicts the conventional computer system of FIG. 1, where the GPU is unable to communicate with the BMC by way of the management bus.

FIG. 2 schematically depicts the conventional computer system 100 where the GPU 108 is unable to communicate with the BMC 104 by way of the management bus 130. In this case, the BMC 104 is unable to receive the temperature information of the GPUs 108. The BMC is unable to receive the temperature information of the GPUs because some GPUs are not configured to send I²C temperature signals to the BMC. Since the GPU cannot pass the temperature information to the BMC 104, the GPUs 108 is unable to effectively control the fan speed of the fans 106. As a result, the GPUs 108 are forced to perform their own assessments to perform slowdowns or shutdowns.

Figure 3:
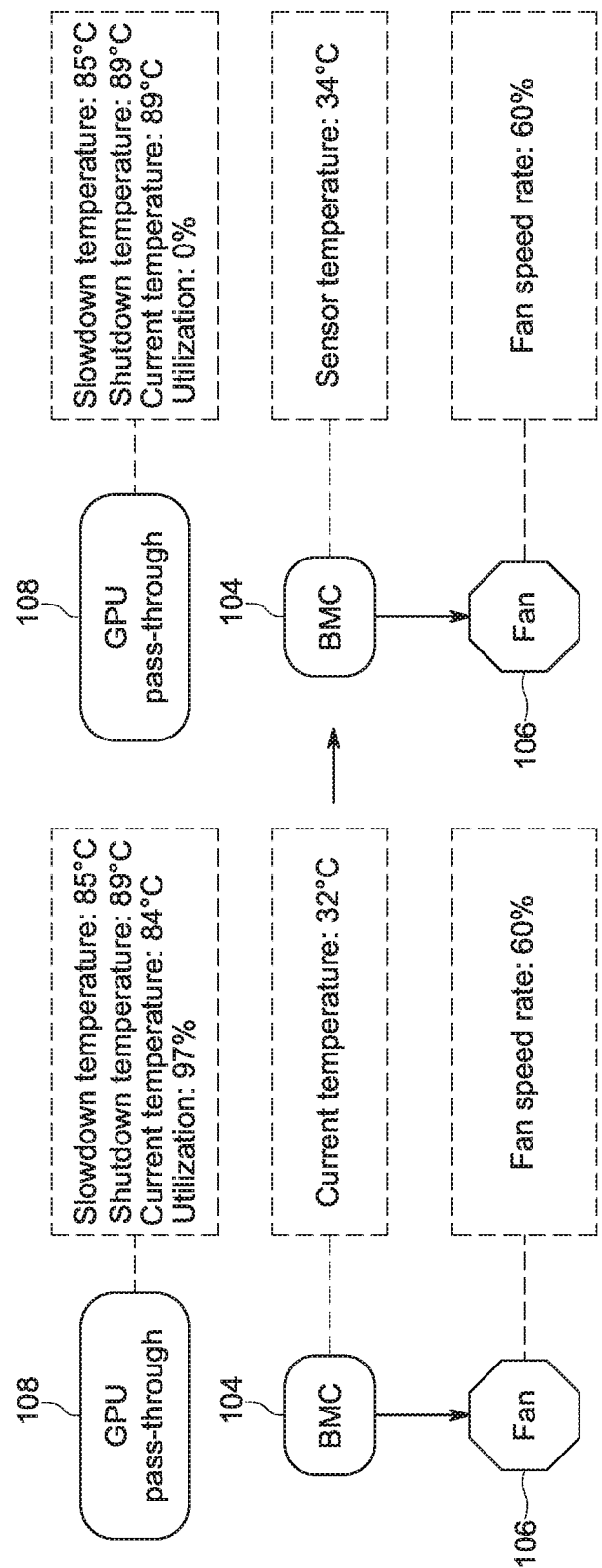
FIG. 3A is prior art that is a schematic representation of a GPU, a BMC, and a fan performance where the GPU is unable to communicate directly with the BMC.
FIG. 3B is a schematic representation of a GPU, a BMC, and a fan performance where the GPU is unable to communicate directly with the BMC.

FIGS. 3A and 3B provide a prior art schematic representation of GPU, BMC, and fan performance where the GPU 108 is untethered to the BMC 104. When the GPU 108 is untethered to the BMC 104, the GPU 108 unable to communicate directly with the BMC 104. In the event the GPU 108 is unable to communicate with the BMC 104, the BMC 104 is forced to rely on its internal temperature sensor, which determines the ambient temperature. In FIG. 3A, the GPU 108 can have a predetermined slowdown threshold temperature of 85 degrees Celsius. The GPU 108 can also have a predetermined shutdown threshold temperature of 89 degrees Celsius. For the purposes of the example of FIG. 3A, the current temperature of GPU 108 can be 84 degrees Celsius, indicating that the GPU is operating at 97% utilization. In this case, the GPU 108 is approaching the threshold temperature at which the GPU 108 will slow down performance in an attempt to not overheat. Furthermore, if the temperature of the GPU 108 should happen to exceed 89 degrees Celsius, the GPU 108 will automatically shut down to prevent any catastrophic damage.

It should be noted that the BMC 104 only detects an ambient temperature of 32 degrees Celsius. This ambient temperature may or may not be impacted by the temperature of the GPU 108. The BMC 104 will notify the fan 106 to operate at a higher speed only if the ambient temperature exceeds a predetermined threshold. This is independent of the GPU temperature. The fan 106 is only operating at 60%, while the GPU is approaching the predetermined slowdown threshold temperature of 85 degrees Celsius.

In FIG. 3B, the current temperature of GPU 108 can be 85 degrees Celsius, indicating that the GPU is operating at 80% utilization. In this case, the GPU 108 has reached the threshold temperature at which the GPU 108 will slow down performance in an attempt to not overheat. The BMC 104 only detects an ambient temperature of 33 degrees Celsius. The BMC will notify the fan 106 to operate at a higher speed only if the ambient temperature exceeds a predetermined threshold. This is independent of the temperature of the GPU 108. The fan 106 is only operating at 60%, while the GPU 108 has reached the predetermined slowdown threshold temperature of 85 degrees Celsius. At this point, the GPU is operating at 0% utilization. Therefore, there is a need for the GPU to be communicatively coupled to the BMC such that the fans can be optimized in response to the GPU temperature. The following discussion provides exemplary embodiments of how the BMC can be coupled to the GPU to receive temperature information and other pertinent information relating to the GPU performance.

Figure 4:
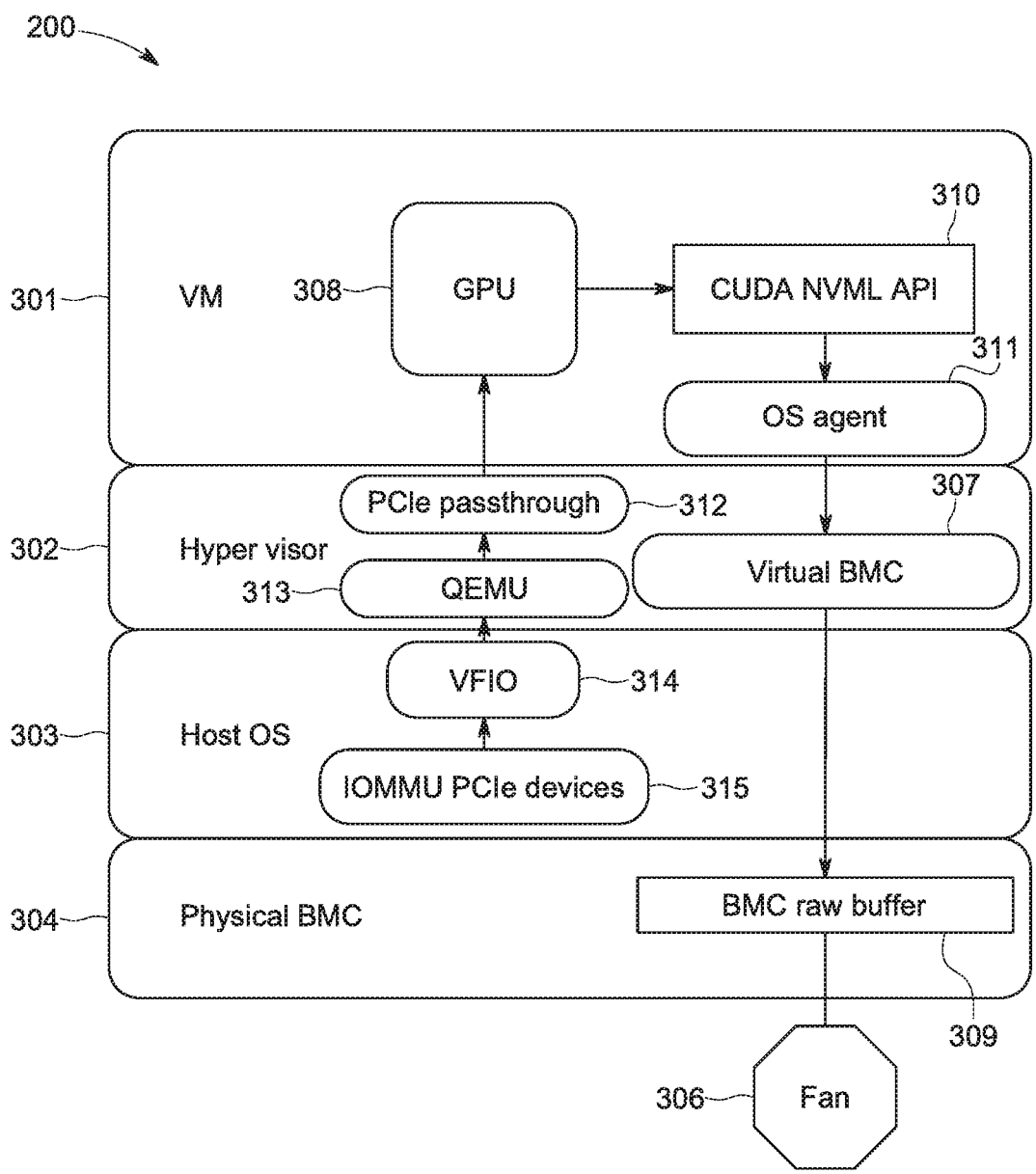
FIG. 4 schematically depicts a stack 200 in accordance with certain embodiments of the present disclosure.

FIG. 4 schematically depicts a stack 200 in accordance with certain embodiments of the present disclosure. FIG. 4 shows a stack 200, and more specifically a stand-alone, general purpose computer system. One skilled in the art would appreciate that the computer systems 200 discussed throughout the present disclosure can be of various types, such as desktop computers, laptop computers, tablet computers, hand-held computers, server computers, blade servers, industrial computers, appliances controllers, electronics equipment controllers, etc. The stack 200 can be a special purpose computer system or a system that incorporates more than one interconnected system, such as a client-server network. Indeed, the stack 200 of FIG. 4 only represents an exemplary embodiment of the present disclosure, and therefore, should not be considered to limit the disclosure in any manner.

The stack 200 can include a virtual machine 301, a hypervisor 302, a host operating system (OS) 303, and a management controller. In some embodiments, the management controller can be a physical BMC 304. The virtual machine 301 can communicate directly with an electronic component. For the purposes of this exemplary embodiment, the electronic component can include a GPU 308. It should be understood by one of ordinary skill in the art that the electronic component can include any thermally sensitive components known in the art. GPUs are well-known in the art, and therefore not described in further detail herein Like many electrical components, the GPU 308 dissipates heat while operating. As such, a fan 306 is used to cool off the GPU 308 after the GPU 308 reaches a prescribed temperature. Such a determination, i.e., whether the GPU 308 exceeds a prescribed temperature, is made by a virtual management controller implemented by utilizing the hypervisor 302. The virtual management controller can include a virtual BMC 307. The hypervisor 302, also called a virtual machine manager (VMM), is typically one of many hardware virtualization techniques allowing multiple operating systems, termed guests, to run concurrently on a host computer. The virtual BMC 307 is configured to pass messages to a raw BMC buffer 309 at the physical BMC 304. Because the stack 200 has a conventional physical BMC 304, the virtual BMC 307 need not function like a physical BMC 304. However, in some embodiments, the virtual BMC 307 can function like a physical BMC 304.

The virtual BMC 307 runs as a part of the hypervisor 302 or on a hypervisor that runs on a CPU (not shown). One skilled in the art would appreciate that the hypervisor 302 can also run on two CPUs, four CPUs, eight CPUs, or any suitable number of CPUs. The hypervisor 302 can be of various types and designs, such as XEN, MICROSOFT HYPER-V, VMWARE ESX. In some embodiments, the operating system 303 can be installed in a virtual machine. In alternative embodiments, the operating system 303 may be running on a physical machine. The operating system 303 can host one or more application programs. For example, the operating system 303 can host input/output memory management unit peripheral component interconnect express (IOMMU PCIe) devices 315. An IOMMU is a memory management unit (MMU) that connects a direct-memory-access-capable (DMA-capable) I/O bus to the main memory Like a traditional MMU, which translates CPU-visible virtual addresses to physical addresses, the IOMMU maps device-visible virtual addresses (also called device addresses or I/O addresses in this context) to physical addresses. Some units also provide memory protection from faulty or malicious devices. An example IOMMU is the graphics address remapping table (GART) used by AGP and PCIe graphics cards on Intel Architecture and AMD computers.

The IOMMU PCIe devices 315 are able to communicate through the Virtual Function IO (VFIO) 314 that allows direct access to the IOMMU PCIe devices 315 from userspace. Although primarily designed as a hypervisor-bypass technology for virtualization uses, it can also be used in a high performance computing (HPC) context. The VFIO 314 allows the IOMMU PCIe devices 315 to communicate through the hypervisor using a quick emulator (QEMU) 313 and a PCIe Passthrough 312. The QEMU 313 is a hosted hypervisor that performs hardware virtualization, and the PCIe Passthrough 312 assigns a IOMMU PCIe device 315 (NIC, disk controller, HBA, USB controller, firewire controller, soundcard, etc) to a virtual machine guest, giving it full and direct access to the IOMMU PCIe device 315. Using the QEMU 313 and the PCIe Passthrough 312, the IOMMU PCIe devices 315 can communicate directly with the GPU 308. For example, where the GPU needs virtualization in the virtual machine, the CPU can enable the IOMMU PCIe devices 315 for the VFIO 314 to virtualize the PCIe device. The QEMU 313 can be configured to read the user's settings, including the VFIO devices. Finally, when the virtual machine loads NVIDIA's driver, the GPU can be recognized as the Passthrough GPU in the virtual machine. While NVIDIA is an example driver and the low end API for retrieving information from the GPU, other drivers can be implemented to perform the same or similar functions.

In certain embodiments, the virtual BMC 307 can be implemented as a part of the hypervisor 302. An operating system agent 311 of the stack 200 runs on the virtual machine 301. The GPU 308 is able to communicate directly with the operating system agent 311 by way of a CUDA NVML API 310. The GPU 308 is in communication with the operating system agent 311, which is also in communication with the virtual BMC 307. The operating system agent 311 communicates with the virtual BMC 307 by way of a system interface. In some embodiments, the system interface can include a keyboard controller style interface. In certain embodiments, the physical BMC 304 can provide advanced monitoring features and more detailed hardware information (such as temperatures in different thermal zones).

The virtual BMC 307 running on the hypervisor 302 can be communicatively coupled by way of the operating system agent 311 to the GPU 308. The virtual BMC 307 can also be communicatively coupled to a GPU temperature sensor (not shown) located at the GPU 308. The virtual BMC 307 can also be communicatively coupled by way of the physical BMC 304 to the fan 306. In this way, the virtual BMC 307 can enable the physical BMC 304 to provide monitoring functionality over the temperature sensor and control functionality over the fan 306. This is discussed in more detail with respect to FIGS. 6A and 6B.

Figure 5:
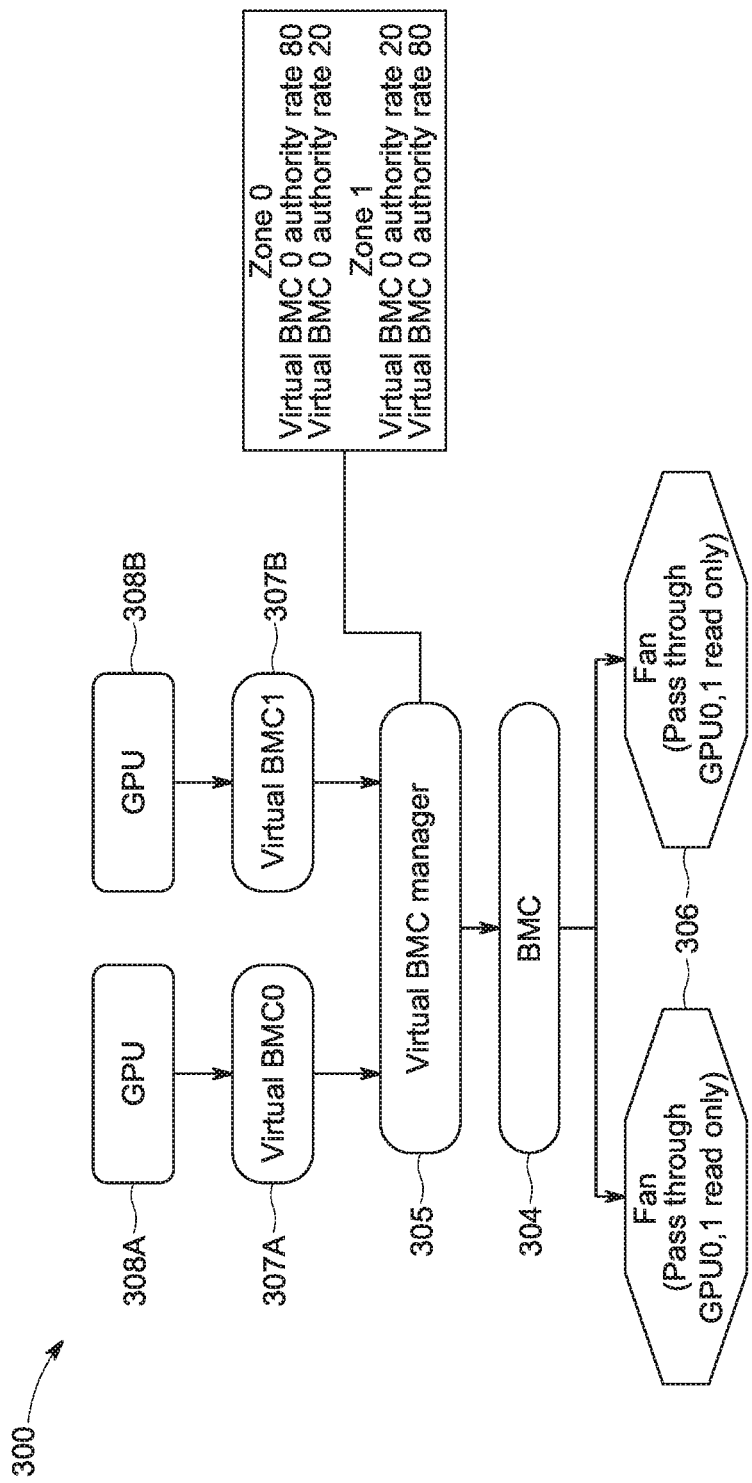
FIG. 5 schematically depicts a stack 300 in accordance with certain embodiments of the present disclosure.

FIG. 5 schematically depicts a stack 300 in accordance with certain embodiments of the present disclosure. The stack 300 illustrates multiple GPU devices 308A and 308B in communication with the physical BMC 304. The stack 300 can provide virtual BMCs 307A and 307B for each GPU device (308A and 308B). Each of the virtual BMCs 307A and 307B can be connected to the physical BMC 304 by way of a virtual BMC manager 305. The virtual BMC manager 305 is implemented to manage the messages received at the physical BMC 304 from the virtual BMCs 307A and 307B. By implementing the virtual BMC manager 305, the physical BMC 304 can receive the temperature information to control the speed of the BMC fan 306s by reading the NVML API temperature messages. The virtual BMC manager 305 also manages authority and access to the physical BMC 304.

Figures 6A, 6B:
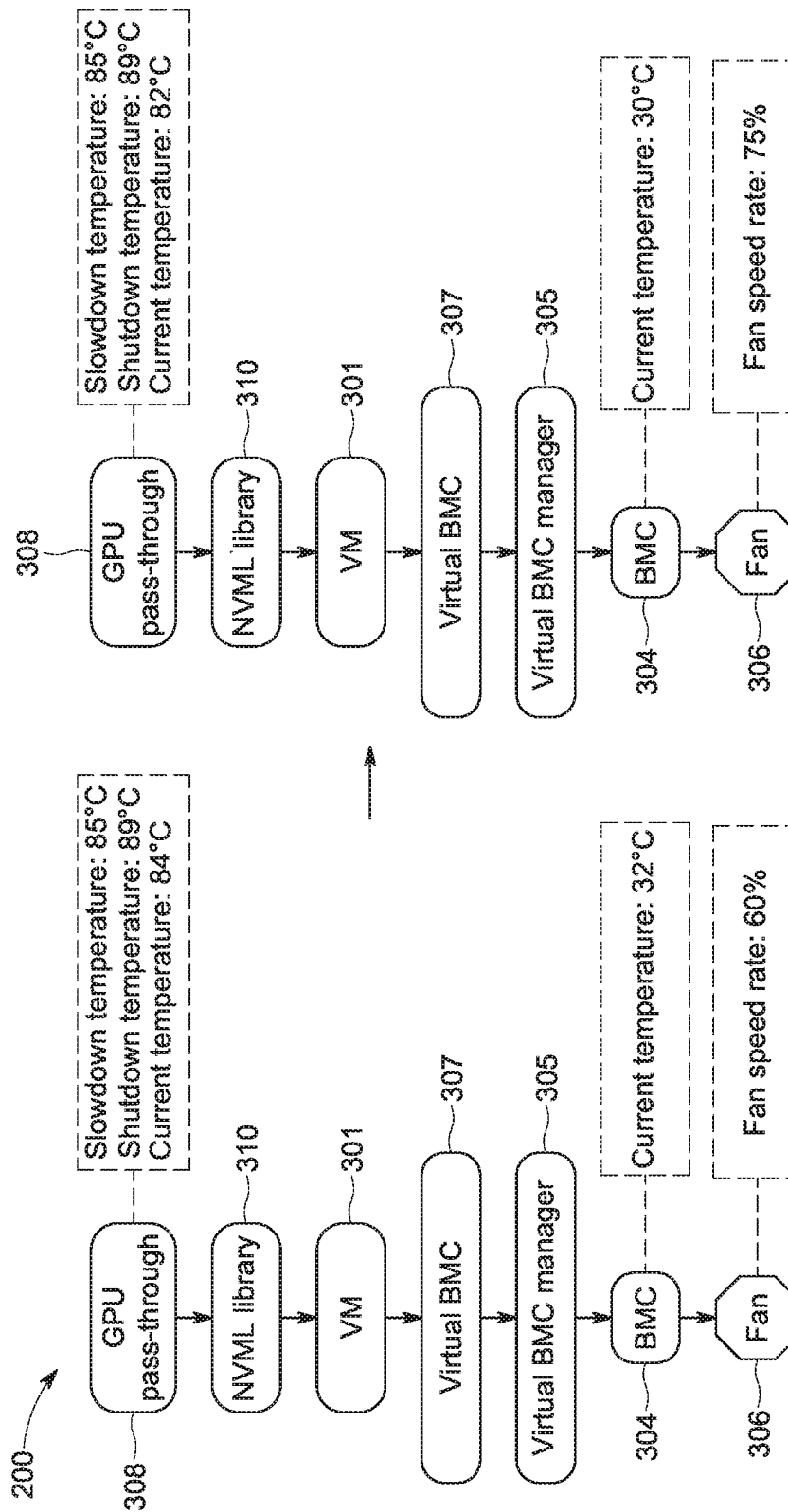
FIG. 6A provide a schematic representation of a GPU, a virtual BMC, a physical BMC, and a fan performance in accordance with an embodiment of the disclosure.
FIG. 6B provide a schematic representation of a GPU, a virtual BMC, a physical BMC, and a fan performance in accordance with an embodiment of the disclosure.

FIGS. 6A and 6B provide a schematic representation of the GPU 308, virtual BMC 307, physical BMC 304, and the fan 306 performance in accordance with an embodiment of the disclosure. In certain embodiments, the physical BMC 304 monitors health-related aspects associated with the stack 200, such as, but not limited to, the temperature of one or more components of the stack 200 (e.g., GPU 308); the speed of rotational components (e.g., spindle motor, fan 306, etc.) within the system; the voltage across or applied to one or more components within the system 200; and the available or used capacity of memory devices within the system 200.

To accomplish these monitoring functions, the physical BMC 304 is communicatively connected to one or more components by way of the virtual BMC 307 and the virtual BMC manager 305. In certain embodiments, these components include sensor devices for measuring various health, operating, and performance-related parameters within the stack 200. The sensor devices may be either hardware or software based components configured or programmed to measure or detect one or more of the various operating and performance-related parameters. The physical BMC 304 monitors health, operating, and performance-related parameters received from various components of the stack 200 in order to determine whether an "event" is occurring within the system 200 by way of the virtual BMC 307. For example, with respect to the configuration shown in FIG. 6A, the physical BMC 304 monitors operation of the GPU 308 by way of the GPU temperature sensor (not shown) to determine whether certain operating or performance related parameters exceed or fall below prescribed threshold ranges of operation. An example of such an event may be the temperature reading of heat dissipated by the GPU 308 reaching 84 degrees Celsius. The fan 306 is operating at 60%. The GPU 308 can have a predetermined slowdown threshold temperature of 85 degrees Celsius and a predetermined shutdown threshold temperature of 89 degrees Celsius. This information can be sent to the physical BMC 304 by way of the virtual BMC 307 and the virtual BMC manager 305.

In accordance with certain embodiments of the disclosure, the physical BMC 304 may also control one or more components of the computer system 100 in response to the occurrence of an event. Referring back to the example above, FIG. 6B illustrates an initiation of the fan 306 in response to the temperature of the GPU 308. The physical BMC 304 may initiate operation of the fan 306 upon determining that the temperature dissipated by the GPU 308 is approaching the predetermined slowdown threshold temperature of 85 degrees Celsius. As indicated in FIG. 6A, the fan 306 is operating at 60% fan capacity. In response to the temperature of the GPU 308 approaching the predetermined shutdown threshold temperature of 89 degrees Celsius, the physical BMC 304 may initiate operation of the fan 306 to operate at 75% fan capacity. This is illustrated in FIG. 6B. The increase in fan capacity can cool the GPU 308 to 82 degrees Celsius.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A method of thermal management in a computing device using a management controller, comprising:
    obtaining, via a virtual management controller implemented by a hypervisor running on one or more processors to emulate a hardware management controller, monitoring information of one or more thermally sensitive components of the computing device, the processor coupled to the one or more thermally sensitive components via a first system interface, wherein the monitoring information comprising temperature information of the one or more thermally sensitive components;
    transmitting, via the one or more processors running the hypervisor implementing the virtual management controller, the monitoring information to the management controller via a second system interface of the management controller, wherein the management controller does not have access to the first system interface; and
    adjusting, via the management controller, operation of at least one thermal management component of the computing device tethered to the management controller.

2. The method of claim 1, wherein the monitoring information for each of the one or more thermally sensitive components comprises identification information.

3. The method of claim 1, wherein the monitoring information for each of the one or more thermally sensitive components comprises a slowdown temperature, a shutdown temperature, and a current temperature.

4. The method of claim 1, wherein at least one of the one or more thermally sensitive components comprises a graphics processing unit.

5. The method of claim 1, further comprising managing, by a virtual baseboard management controller manager, messages received at the management controller from two or more virtual management controllers.

6. The method of claim 1, wherein the management controller is a baseboard management controller.

7. The method of claim 1, wherein the at least one thermal management component is a fan device.

8. The method of claim 1, wherein the virtual management controller is a virtual baseboard management controller.

9. A computer system for thermal management of a computing device using a management controller, comprising:
    one or more thermally sensitive components;
    one or more processors coupled to the one or more thermally sensitive components via a first system interface;
    a management controller comprising a second system interface, wherein the management controller does not have access to the first system interface;
    at least one thermal management component tethered to the management controller; and
    a virtual management controller implemented by a hypervisor running on the one or more processors to emulate a hardware management controller, the virtual management controller, configured to:
    obtain monitoring information of the one or more thermally sensitive components of the computing device, the monitoring information comprising temperature information of the one or more thermally sensitive components;
    transmit the monitoring information to the management controller via the second system interface of the management controller; and
    adjust operation of the at least one thermal management component of the computing device tethered to the management controller.

10. The computer system of claim 9, wherein the monitoring information for each of the one or more thermally sensitive components comprises identification information.

11. The computer system of claim 9, wherein the monitoring information for each of the one or more thermally sensitive components comprises a slowdown temperature, a shutdown temperature, and a current temperature.

12. The computer system of claim 9, wherein at least one of the one or more thermally sensitive components comprises a graphics processing unit.

13. The computer system of claim 9, further comprising a virtual baseboard management controller manager configured to manage messages received at the management controller from two or more virtual management controllers.

14. The computer system of claim 9, wherein the management controller is a baseboard management controller.

15. The computer system of claim 9, wherein the at least one thermal management component is a fan device.

16. The computer system of claim 9, wherein the virtual management controller is a virtual baseboard management controller.

17. A non-transitory computer readable medium that stores instructions executable by at least one processor, the instructions comprising:
    obtaining, via a virtual management controller implemented by a hypervisor running on one or more processors to emulate a hardware management controller, monitoring information of one or more thermally sensitive components of a computing device, the one or more processors coupled to the one or more thermally sensitive components via a first system interface, wherein the monitoring information comprising temperature information of the one or more thermally sensitive components;
    transmitting, via the one or more processors running the hypervisor implementing the virtual management controller, the monitoring information to the management controller via a second system interface of the management controller, wherein the management controller does not have access to the first system interface; and
    adjusting, via the management controller, operation of at least one thermal management component of the computing device tethered to the management controller.

18. The non-transitory computer readable medium of claim 17, wherein the monitoring information for each of the one or more thermally sensitive components comprises a slowdown temperature, a shutdown temperature, and a current temperature.

19. The non-transitory computer readable medium of claim 17, wherein at least one of the one or more thermally sensitive components comprises a graphics processing unit.

20. The non-transitory computer readable medium of claim 17, wherein the management controller is a baseboard management controller, and the virtual management controller is a virtual baseboard management controller.

* * * * *